(12) United States Patent
Han

(10) Patent No.: US 7,516,009 B1
(45) Date of Patent: Apr. 7, 2009

(54) INTAKE CHARGE DEFICIT METHOD FOR ENGINE REAL-TIME DIAGNOSTICS APPLICATION

(75) Inventor: Zhiping Han, La Salle (CA)

(73) Assignee: Detroit Diesel Corporation, Detroit, MI (US)

( * ) Notice: Subject to any disclaimer, the term of this patent is extended or adjusted under 35 U.S.C. 154(b) by 15 days.

(21) Appl. No.: 11/857,472

(22) Filed: Sep. 19, 2007

(51) Int. Cl.
*F02D 41/00* (2006.01)

(52) U.S. Cl. ........................................ 701/114

(58) Field of Classification Search .................. 701/114, 701/102, 101, 115; 60/602, 606
See application file for complete search history.

(56) References Cited

U.S. PATENT DOCUMENTS

| | | |
|---|---|---|
| 6,347,519 B1 | 2/2002 | Kreso |
| 6,588,210 B2 | 7/2003 | Kreso |
| 6,601,387 B2 | 8/2003 | Zurawski et al. |
| 6,948,483 B2 | 9/2005 | Veinotte et al. |
| 6,988,365 B2 | 1/2006 | Sasaki |

FOREIGN PATENT DOCUMENTS

| | | | |
|---|---|---|---|
| EP | 1 234 970 A2 | * | 8/2002 |
| JP | 2002-250246 A | * | 9/2002 |

* cited by examiner

*Primary Examiner*—Hieu T Vo
(74) *Attorney, Agent, or Firm*—Bill C. Panagos; Rader, Fishman & Grauer, PLLC

(57) ABSTRACT

The present invention relates to a method of engine operation to provide a real time engine diagnostic to detect EGR, turbocharger or compressor malfunctions and to prevent such malfunctions from damaging the engine.

5 Claims, 3 Drawing Sheets

INTAKE CHARGE DEFICIT METHOD FOR ENGINE REAL-TIME DIAGNOSTICS APPLICATION

BACKGROUND OF THE INVENTION

1. Field of the Invention

The present invention relates to a method of engine operation to provide a real time engine diagnostic to detect malfunctions covered by hardware failure that may cause the engine or its components to be damaged, or their performance to be degraded, or the engine exhaust emissions to be non-compliant.

The present invention is further related to a method of engine operation to provide a real time engine diagnostic to detect EGR, turbocharger or compressor malfunctions and to prevent such malfunctions from damaging the engine.

2. Description of the Related Art

Kreso, U.S. Pat. No. 6,588,210 discloses the system and method for measuring the flow rate of recirculated exhaust gas in the compression ignition engine including a plurality of engine sensors having outputs indicative of current engine condition and a turbocharger. The system includes an exhaust gas recirculation valve mounted in the exhaust pipe upstream of the turbocharger for diverting a selectable portion of the exhaust gas for recirculation in combination with the charge air, one or more sensors for sensing current conditions of the recirculated exhaust gas, including temperature and pressure, one or more sensors for sensing current conditions of the intake air, and control logic for determining the flow rate of the recirculated exhaust gas as a function of the sensed conditions. In one embodiment, the system includes an obstruction in the flow path of the recirculated exhaust gas and a different pressure sensor for determining the pressure differential between a point upstream of the obstruction and a point downstream as the obstruction and control logic for determining the flow rate of the recirculated gas as a function of the current intake manifold pressure, the recirculated exhaust gas temperature, and the differential pressure drop across the obstruction.

In the differential pressure embodiment, the flow rate of the recirculated gas is determined from the voltage input from the differential pressure sensor and from the sensed recirculated exhaust gas temperature, according to the formula EGR flow rate (KG/MIN) equals EGR gas density/density collection) $^a*b*$ (differential pressure drop, kPa)$^c$ where the density correction a, b, and C are each calibratable constants for a particular orifice design.

SUMMARY OF THE INVENTION

The present invention is a method to operate an internal combustion engine to provide real time diagnostics to detect hardware failures, said internal combustion engine having electronic sensors in communication with said electronic control central unit with memory, unit and variable engine system components including an exhaust gas recirculation valve. The method comprises determining a target intake air flow rate based upon target engine operation during exhaust smoke control time period; determining an actual air intake flow rate based upon actual sensed engine operation during said exhaust smoke control time period; and determining an air mass deficit as an accumulated air intake charge quantity difference between the targeted intake air flow and the actual intake air flow charge during the exhaust smoke control time period according to the formula:

$$\text{Air\_mass\_defict} = \int_{\text{smoke\_control\_start}}^{\text{smoke\_control\_end}} [(\text{target\_air\_flow\_rate}) - (\text{actual\_air\_flow\_rate})] dt$$

The smoke control period occurs when engine fueling is limited because of an air intake shortage while engine torque value is below maximum available engine torque value. In addition, if the air mass deficit value exceeds a threshold, at least one of a fault in flagged engine is derated, and a warning is activated to alert operator of fault to protect at least in the ECU one of the engine or engine system components from damage. When the air mass deficit value is operated then a threshold value stored in the ECU for the engine during a given operation, a hardware failure causing intake air quality degredation during acceleration is indicated. The hardware failure is indicative of at least one of EGR valve stick at least partially open, a turbocharger malfunction, or a compressor malfunction, or EGR loop exhaust gas leakage, or intake air flow leakage.

DETAILED DESCRIPTION OF THE PREFERRED EMBODIMENT(S)

Figure 1:
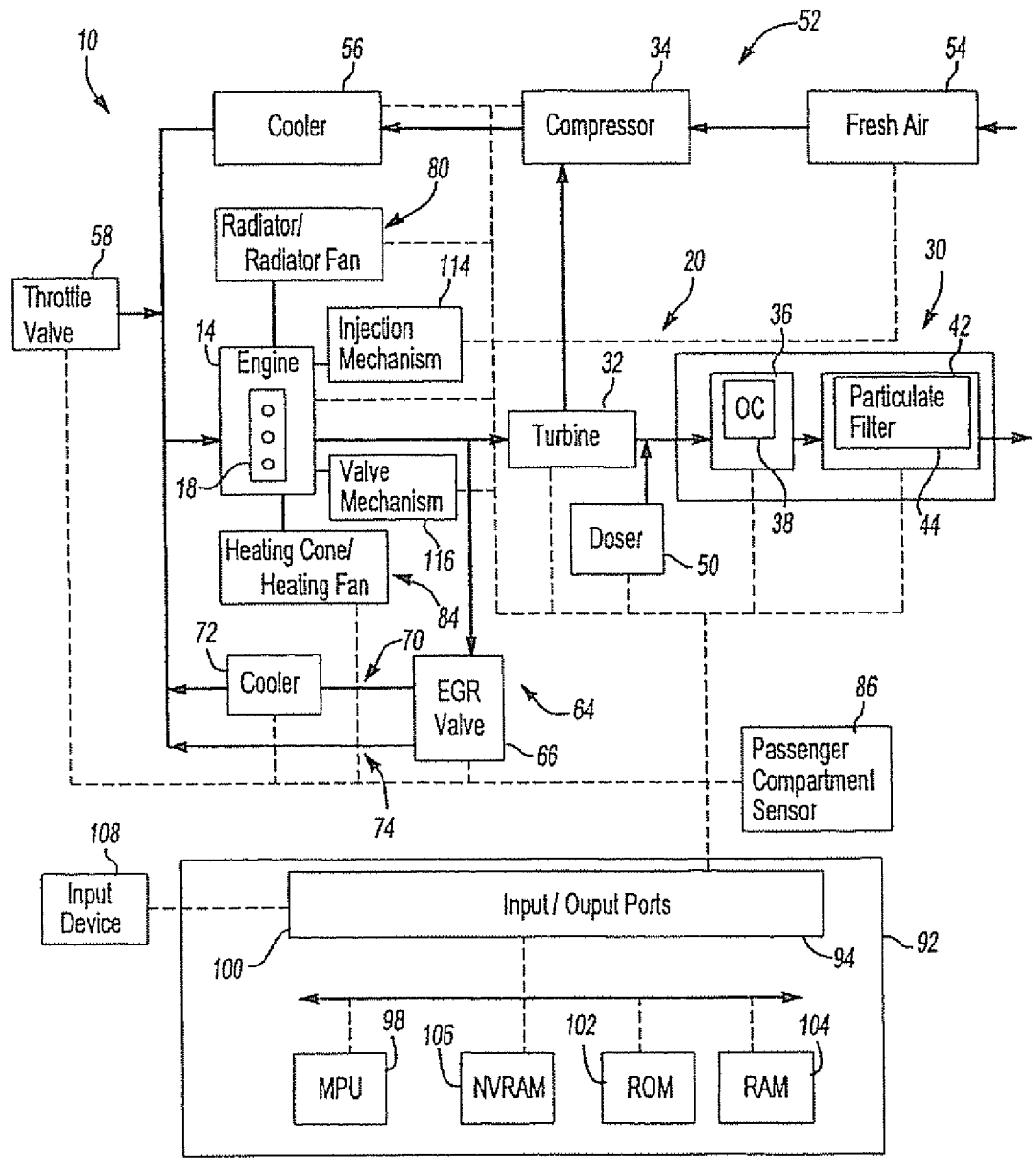
FIG. 1 is a schematic representation of an internal combustion engine, various component systems and an electronic control unit.

FIG. 1 illustrates a vehicle powertrain system 10 in accordance with one non-limiting aspect of the present invention. The system 10 may provide power for driving any number of vehicles, including on-highway trucks, construction equipment, marine vessels, stationary generators, automobiles, trucks, tractor-trailers, boats, recreational vehicle, light and heavy-duty work vehicles, and the like.

The system 10 may be referred to as an internal combustion driven system wherein fuels, such as gasoline and diesel fuels, are burned in a combustion process to provide power, such as with a spark or compression ignition engine 14. The engine 14 may be a diesel engine that includes a number of cylinders 18 into which fuel and air are injected for ignition as one skilled in the art will appreciate. The engine 14 may be a multi-cylinder compression ignition internal combustion engine, such as a 4, 6, 8, 12, 16, or 24 cylinder diesel engines, for example. It should be noted, however, that the present invention is not limited to a particular type of engine or fuel.

Exhaust gases generated by the engine 14 during combustion may be emitted through an exhaust system 20. The exhaust system 20 may include any number of features, including an exhaust manifold and passageways to deliver the emitted exhaust gases to a particulate filter assembly 30, which in the case of diesel engines is commonly referred to as a diesel particulate filter. Optionally, the system 20 may include a turbocharger proximate the exhaust manifold for compressing fresh air delivery into the engine 14. The turbocharger, for example, may include a turbine 32 and a compressor 34, such as a variable geometry turbocharger (VGT)

and/or a turbo compound power turbine. Of course, the present invention is not limited to exhaust systems having turbochargers or the like.

The particulate filter assembly 30 may be configured to capture particulates associated with the combustion process. In more detail, the particulate filter assembly 30 may include an oxidation catalyst (OC) canister 36, which in includes an OC 38, and a particulate filter canister 42, which includes a particulate filter 44. The canisters 36, 42 may be separate components joined together with a clamp or other feature such that the canisters 36, 42 may be separated for servicing and other operations. Of course, the present invention is not intended to be limited to this exemplary configuration for the particulate filter assembly 30. Rather, the present invention contemplates the particulate filter assembly including more or less of these components and features. In particular, the present invention contemplates the particulate filter assembly 30 including only the particulate filter 44 and not necessarily the OC canister 36 or substrate 38 and that the particulate filter 44 may be located in other portions of the exhaust system 20, such as upstream of the turbine 32.

The OC 38, which for diesel engines is commonly referred to as a diesel oxidation catalyst, may oxidize hydrocarbons and carbon monoxide included within the exhaust gases so as to increase temperatures at the particulate filter 44. The particulate filter 44 may capture particulates included within the exhaust gases, such as carbon, oil particles, ash, and the like, and regenerate the captured particulates if temperatures associated therewith are sufficiently high. In accordance with one non-limiting aspect of the present invention, one object of the particulate filter assembly 30 is to capture harmful carbonaceous particles included in the exhaust gases and to store these contaminates until temperatures at the particulate filter 44 favor oxidation of the captured particulates into a gas that can be discharged to the atmosphere.

The OC and particulate filter canisters 36, 42 may include inlets and outlets having defined cross-sectional areas with expansive portions there between to store the OC 38 and particulate filter 44, respectively. However, the present invention contemplates that the canisters 36, 42 and devices therein may include any number configurations and arrangements for oxidizing emissions and capturing particulates. As such, the present invention is not intended to be limited to any particular configuration for the particulate filter assembly 30.

To facilitate oxidizing the capture particulates, a doser 50 may be included to introduce fuel to the exhaust gases such that the fuel reacts with the OC 38 and combusts to increase temperatures at the particulate filter 44, such as to facilitate regeneration. For example, one non-limiting aspect of the present invention contemplates controlling the amount of fuel injected from the doser as a function of temperatures at the particulate filter 44 and other system parameters, such as air mass flow, EGR temperatures, and the like, so as to control regeneration. However, the present invention also contemplates that fuel may be included within the exhaust gases through other measures, such as by controlling the engine 14 to emit fuel with the exhaust gases.

An air intake system 52 may be included for delivering fresh air from a fresh air inlet 54 through an air passage to an intake manifold for introduction to the engine 14. In addition, the system 52 may include an air cooler or charge air cooler 56 to cool the fresh air after it is compressed by the compressor 34. Optionally, a throttle intake valve 58 may be provided to control the flow of fresh air to the engine 14. Optionally, the throttle intake valve 58 may also be provided to control the flow of EGR gases to the engine 14 or control both fresh air and EGR gases 64 to the engine 14. The throttle valve 58 may be a manually or electrically operated valve, such as one which is responsive to a pedal position of a throttle pedal operated by a driver of the vehicle. There are many variations possible for such an air intake system and the present invention is not intended to be limited to any particular arrangement. Rather, the present invention contemplates any number of features and devices for providing fresh air to the intake manifold and cylinders, including more or less of the foregoing features.

An exhaust gas recirculation (EGR) system 64 may be optionally provided to recycle exhaust gas to the engine 14 for mixture with the fresh air. The EGR system 64 may selectively introduce a metered portion of the exhaust gasses into the engine 14. The EGR system 64, for example, may dilute the incoming air charge and lower peak combustion temperatures to reduce the amount of oxides of nitrogen produced during combustion. The amount of exhaust gas to be recirculated may be controlled by controlling an EGR valve 66 and/or in combination with other features, such as the turbocharger. The EGR valve 66 may be a variable flow valve that is electronically controlled. There are many possible configurations for the controllable EGR valve 66 and embodiments of the present invention are not limited to any particular structure for the EGR valve 66.

The EGR system 64 in one non-limiting aspect of the present invention may include an EGR cooler passage 70, which includes an EGR cooler 72, and an EGR cooler bypass 74. The EGR valve 66 may be provided at the exhaust manifold to meter exhaust gas through one or both of the EGR cooler passage 70 and bypass 74. Of course, the present invention contemplates that the EGR system 64 may include more or less of these features and other features for recycling exhaust gas. Accordingly, the present invention is not intended to be limited to any one EGR system and contemplates the use of other such systems, including more or less of these features, such as an EGR system having only one of the EGR cooler passage or bypass.

A cooling system 80 may be included for cycling the engine 14 by cycling coolant there through. The coolant may be sufficient for fluidly conducting away heat generated by the engine 14, such as through a radiator. The radiator may include a number of fins through which the coolant flows to be cooled by air flow through an engine housing and/or generated by a radiator fan directed thereto as one skilled in the art will appreciated. It is contemplated, however, that the present invention may include more or less of these features in the cooling system 80 and the present invention is not intended to be limited to the exemplary cooling system described above.

The cooling system 80 may operate in conjunction with a heating system 84. The heating system 84 may include a heating core, a heating fan, and a heater valve. The heating core may receive heated coolant fluid from the engine 14 through the heater valve so that the heating fan, which may be electrically controllable by occupants in a passenger area or cab of a vehicle, may blow air warmed by the heating core to the passengers. For example, the heating fan may be controllable at various speeds to control an amount of warmed air blown past the heating core whereby the warmed air may then be distributed through a venting system to the occupants. Optionally, sensors and switches 86 may be included in the passenger area to control the heating demands of the occupants. The switches and sensors may include dial or digital switches for requesting heating and sensors for determining whether the requested heating demand was met. The present invention contemplates that more or less of these features may be included in the heating system and is not intended to be limited to the exemplary heating system described above.

A controller 92, such as an electronic control module or engine control module, may be included in the system 10 to control various operations of the engine 14 and other system or subsystems associated therewith, such as the sensors in the exhaust, EGR, and intake systems. Various sensors may be in electrical communication with the controller via input/output ports 94. The controller 92 may include a microprocessor unit (MPU) 98 in communication with various computer readable storage media via a data and control bus 100. The computer readable storage media may include any of a number of known devices which function as read only memory 102, random access memory 104, and non-volatile random access memory 106. A data, diagnostics, and programming input and output device 108 may also be selectively connected to the controller via a plug to exchange various information therebetween. The device 108 may be used to change values within the computer readable storage media, such as configuration settings, calibration variables, instructions for EGR, intake, and exhaust systems control and others.

The system 10 may include an injection mechanism 114 for controlling fuel and/or air injection for the cylinders 18. The injection mechanism 114 may be controlled by the controller 92 or other controller and comprise any number of features, including features for injecting fuel and/or air into a common-rail cylinder intake and a unit that injects fuel and/or air into each cylinder individually. For example, the injection mechanism 114 may separately and independently control the fuel and/or air injected into each cylinder such that each cylinder may be separately and independently controlled to receive varying amounts of fuel and/or air or no fuel and/or air at all. Of course, the present invention contemplates that the injection mechanism 114 may include more or less of these features and is not intended to be limited to the features described above.

The system 10 may include a valve mechanism 116 for controlling valve timing of the cylinders 18, such as to control air flow into and exhaust flow out of the cylinders 18. The valve mechanism 116 may be controlled by the controller 92 or other controller and comprise any number of features, including features for selectively and independently opening and closing cylinder intake and/or exhaust valves. For example, the valve mechanism 116 may independently control the exhaust valve timing of each cylinder such that the exhaust and/or intake valves may be independently opened and closed at controllable intervals, such as with a compression brake. Of course, the present invention contemplates that the valve mechanism may include more or less of these features and is not intended to be limited to the features described above.

In operation, the controller 92 receives signals from various engine/vehicle sensors and executes control logic embedded in hardware and/or software to control the system 10. The computer readable storage media may, for example, include instructions stored thereon that are executable by the controller 92 to perform methods of controlling all features and sub-systems in the system 10. The program instructions may be executed by the controller in the MPU 98 to control the various systems and subsystems of the engine and/or vehicle through the input/output ports 94. In general, the dashed lines shown in FIG. 1 illustrate the optional sensing and control communication between the controller and the various components in the powertrain system. Furthermore, it is appreciated that any number of sensors and features may be associated with each feature in the system for monitoring and controlling the operation thereof.

In one non-limiting aspect of the present invention, the controller 92 may be the DDEC controller available from Detroit Diesel Corporation, Detroit, Mich. Various other features of this controller are described in detail in a number of U.S. patents assigned to Detroit Diesel Corporation. Further, the controller may include any of a number of programming and processing techniques or strategies to control any feature in the system 10. Moreover, the present invention contemplates that the system may include more than one controller, such as separate controllers for controlling system or subsystems, including an exhaust system controller to control exhaust gas temperatures, mass flow rates, and other features associated therewith. In addition, these controllers may include other controllers besides the DDEC controller described above.

In accordance with one non-limiting aspect of the present invention, the controller 92 or other feature, may be configured for permanently storing emission related fault codes in memory that is not accessible to unauthorized service tools. Authorized service tools may be given access by a password and in the event access is given, a log is made of the event as well as whether any changes that are attempted to made to the stored fault codes. It is contemplated that any number of faults may be stored in permanent memory, and that preferably eight such faults are stored in memory.

Figure 2:
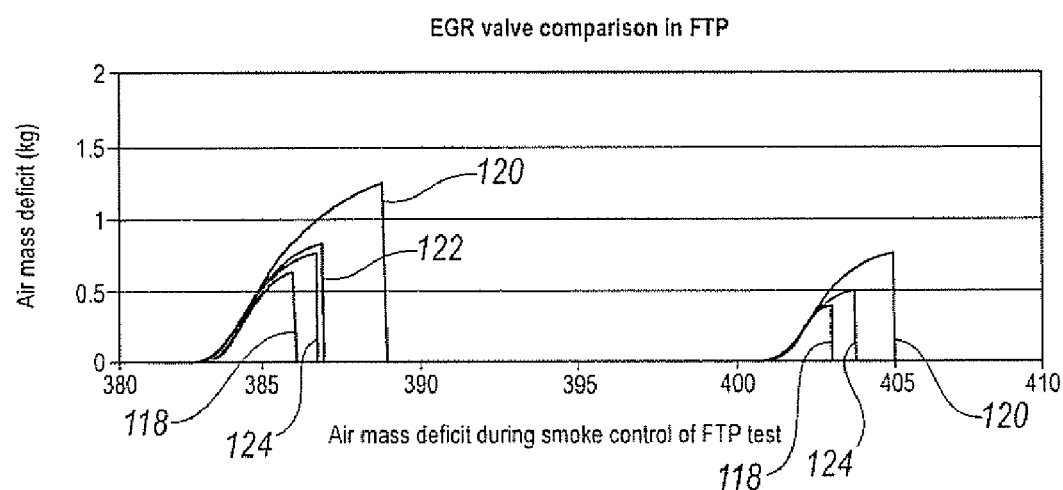
FIG. 2 is a graph representing EGR value position comparison in FTP.

FIG. 2 shows an engine test conducted to check the invention's capability to detect either excessive EGR flow or leakage. The test was conducted in two groups. The first group of tests simulated excessive EGR flow. The second group of tests simulated the EGR loop leakage. The transient FTP test was chosen for this purpose. During the excessive EGR flow engine test, the EGR valve was locked at different opening positions to simulate stuck valve malfunction of failing to close during accelerations. The EGR loop leakage test used by a by-pass valve inserted into the EGR flow pipe and the EGR leaking rate was measured by how many turns the by-pass valve was opened, not directly the leaking flow rate measurement. The air mass deficit value with normally functioning parts was used as baseline (reference) in data comparison.

FIG. 2 shows the air mass deficit values of an engine operation baseline 118, the value of an EGR value stuck fully open 120, EGR valve stuck 30% open 122, and 1.75 turns of EGR leaking valve opening 124 respectively. As seen in FIG. 2, the peak values of the air mass deficit increased with either a stuck open EGR valve, or a leaking EGR loop and the peak value difference is sufficient to detect if the engine is experiencing an air supply shortage problem from failed parts. The first requirement is to detect a fully to partially opened EGR loop that may cause excessive EGR flow during acceleration, which in turn causes reduced air flow during smoke control. The second requirement is to detect the EGR leakage from the EGR loop out to the atmosphere.

Figure 3:
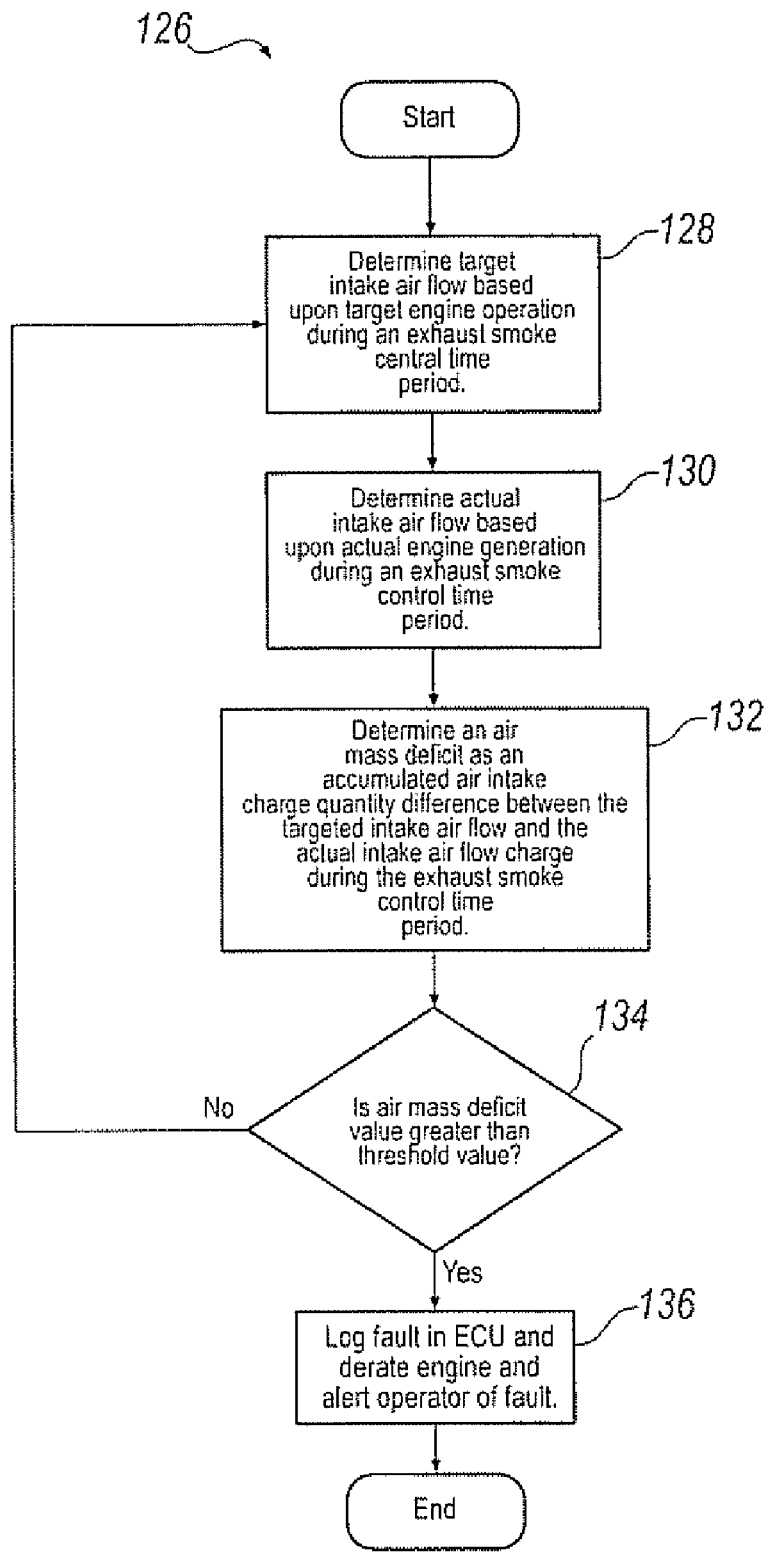
FIG. 3 is a schematic representation of a software flow chart of one method according to the present invention.

FIG. 3 is a schematic representation of one method according to the present invention. Method 126 is directed to one method from the operation of an internal combustion engine. Step 128 is to determine a target intake air flow based upon the target engine operation during an exhaust smoke control period. In this regard, it is contemplated that various target engine operations and various target intake air flow values are kept in a table in memory of the ECU. These are used during smoke control time periods that usually happen during periods of acceleration and refer to an engine control strategy used when fueling is limited for the reason of air shortage while engine torque is below a maximum achievable value. Step 130 is determining actual intake air flow valve based upon actual engine operation during an exhaust smoke control time period. Step 132 is determining an air mass flow deficit as an accumulated air intake charge quantity difference between the targeted intake air flow and the actual intake air flow charge during the exhaust smoke control time period. Step 134 is determining whether the air flow intake mass deficit value is greater than the air intake mass deficit threshold value. If no, the software loops back to step 128. If yes, step 136 is logging a fault in the ECU, derating the engine to prevent any damage to the engine or any component systems, and actuating a warning to alert an operator of the fault.

While the invention has been described, those skilled in the art understand that the words used herein are words of description, and not words of limitation. Many variation and medications are possible without departing from the scope and spirit of the invention as set forth in the appended claims.

What is claimed as new and desired to be protected by Letters Patent of the United States is:

1. A method to operate an internal combustion engine to provide real time diagnostics to detect hardware failures, said internal combustion engine having electronic sensors in communication with said electronic control central unit with memory, unit and variable engine system components including an exhaust gas recirculation valve, said method comprising:
   determining a target intake air flow rate based upon target engine operation during exhaust smoke control time period;
   determining an actual air intake flow rate based upon actual sensed engine operation during said exhaust smoke control time period;
   determining an air mass deficit as an accumulated air intake charge quantity difference between the targeted intake air flow and the actual intake air flow charge during the exhaust smoke control time period according to the formula:

$$\text{Air\_mass\_deficit} = \int_{\text{smoke\_control\_start}}^{\text{smoke\_control\_end}} [(\text{target\_air\_flow\_rate}) - (\text{actual\_air\_flow\_rate})] \, dt.$$

2. The method of claim 1, wherein said smoke control period occurs when engine fueling is limited because of an air intake shortage while engine torque value is below maximum available engine torque value.

3. The method of claim 1, wherein when the intake air mass flow mass deficit exceeds a threshold, at least one of a fault in flagged engine is derated, and a warning is activated to alert operator of fault to protect at least in the ECU one of the engine or engine system components from damage.

4. The method of claim 1, wherein when the air mass flow intake value is operated then an air intake reference value stored in the ECU for the engine during a given operation, a hardware failure causing intake air quality degredation during acceleration is indicated.

5. The method of claim 4 wherein said hardware failure is indicative of at least one of EGR valve stick at least partially open, a turbocharger malfunction, or a compressor malfunction, or EGR loop exhaust leakage, or intake air flow leakage.

* * * * *